(12) United States Patent
Wilson et al.

(10) Patent No.: US 11,907,153 B2
(45) Date of Patent: Feb. 20, 2024

(54) SYSTEM AND METHOD FOR DISTRIBUTED SUBSCRIPTION MANAGEMENT

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 17/570,726

(22) Filed: Jan. 7, 2022

(65) Prior Publication Data

US 2023/0222080 A1 Jul. 13, 2023

(51) Int. Cl.
*G06F 13/40* (2006.01)
*G06F 11/07* (2006.01)
*G06F 13/362* (2006.01)

(52) U.S. Cl.
CPC ...... *G06F 13/4031* (2013.01); *G06F 11/0754* (2013.01); *G06F 13/3625* (2013.01); *G06F 13/4022* (2013.01)

(58) Field of Classification Search
CPC ............. G06F 13/4031; G06F 11/0754; G06F 13/3625
See application file for complete search history.

(56) References Cited

U.S. PATENT DOCUMENTS

| | | | |
|---|---|---|---|
| 6,317,815 | B1 | 11/2001 | Mayer et al. |
| 6,421,727 | B1 | 7/2002 | Reifer et al. |
| 7,464,163 | B1 | 12/2008 | Bantz et al. |
| 9,178,948 | B2 | 11/2015 | Chen et al. |
| 9,529,602 | B1 | 12/2016 | Swierk et al. |
| 9,705,995 | B2 | 7/2017 | Edlund et al. |
| 10,044,522 | B1 | 8/2018 | Shamis et al. |

(Continued)

OTHER PUBLICATIONS

Souvik Chakravarty (2019). Arm System Control Processor (SCP) Firmware-101. Linaro. https://static.linaro.org/connect/san19/presentations/san19-117.pdf.

(Continued)

*Primary Examiner* — Phong H Dang
(74) *Attorney, Agent, or Firm* — Womble Bond Dickinson (US) LLP

(57) ABSTRACT

Methods, systems, and devices for providing computer implemented services using managed systems are disclosed. To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services. To improve the likelihood of the computer implemented services being provided, the managed devices may be managed using a subscription based model. The subscription model may utilize a highly accessible service to obtain information regarding desired capabilities (e.g., a subscription) of a managed system, and use the acquired information to automatically configure and manage the features and capabilities of the managed systems.

20 Claims, 8 Drawing Sheets

(56) References Cited

U.S. PATENT DOCUMENTS

| | | | |
|---|---|---|---|
| 11,588,909 B1 | 2/2023 | Wilson et al. | |
| 11,632,315 B1 | 4/2023 | Sawal et al. | |
| 11,671,379 B1 | 6/2023 | Wilson et al. | |
| 11,803,667 B2 | 10/2023 | Singh et al. | |
| 2003/0131028 A1 | 7/2003 | Radi et al. | |
| 2005/0122900 A1* | 6/2005 | Tuulos | H04L 41/0894 370/229 |
| 2005/0182843 A1 | 8/2005 | Reistad et al. | |
| 2006/0010477 A1 | 1/2006 | Yu | |
| 2006/0136747 A1 | 6/2006 | Ahdout et al. | |
| 2007/0091862 A1* | 4/2007 | Ioannidis | H04W 8/12 370/338 |
| 2007/0214193 A1 | 9/2007 | Takahashi et al. | |
| 2008/0235784 A1 | 9/2008 | Basner et al. | |
| 2008/0256641 A1* | 10/2008 | Lo | G06F 21/10 726/26 |
| 2009/0077407 A1 | 3/2009 | Akimoto | |
| 2011/0225574 A1 | 9/2011 | Khalidi et al. | |
| 2012/0005649 A1 | 1/2012 | Lavin | |
| 2012/0042388 A1 | 2/2012 | Rive et al. | |
| 2012/0076131 A1* | 3/2012 | Bianconi | H04L 65/70 370/352 |
| 2012/0144177 A1 | 6/2012 | Iyigun et al. | |
| 2012/0311673 A1* | 12/2012 | Sodah | H04L 63/102 726/4 |
| 2013/0198346 A1 | 8/2013 | Jubran et al. | |
| 2013/0339306 A1* | 12/2013 | Kim | G06F 11/1451 707/652 |
| 2014/0074793 A1 | 3/2014 | Doering et al. | |
| 2015/0005033 A1 | 1/2015 | Petersson et al. | |
| 2015/0271276 A1 | 9/2015 | Edlund et al. | |
| 2015/0278323 A1 | 10/2015 | Melahn et al. | |
| 2015/0373012 A1 | 12/2015 | Bartz et al. | |
| 2016/0150396 A1* | 5/2016 | Milhizer | H04L 43/0876 455/405 |
| 2016/0188868 A1 | 6/2016 | Otturu et al. | |
| 2016/0231804 A1 | 8/2016 | Bulusu et al. | |
| 2017/0006119 A1 | 1/2017 | Pogrebinsky et al. | |
| 2017/0048713 A1 | 2/2017 | Guday et al. | |
| 2017/0090912 A1 | 3/2017 | Fuglsang et al. | |
| 2017/0244783 A1 | 8/2017 | Maresca | |
| 2017/0359356 A1* | 12/2017 | Brandwine | H04L 63/08 |
| 2019/0018715 A1 | 1/2019 | Behrendt et al. | |
| 2019/0044793 A1* | 2/2019 | Chew | H04L 41/0672 |
| 2021/0067406 A1* | 3/2021 | Myers | G06F 11/3409 |
| 2021/0160255 A1 | 5/2021 | Cherkas et al. | |
| 2021/0342173 A1 | 11/2021 | Tsirkin | |
| 2021/0360074 A1 | 11/2021 | Long | |
| 2022/0164838 A1 | 5/2022 | Wang | |
| 2022/0200928 A1 | 6/2022 | Garrison et al. | |
| 2023/0171586 A1 | 6/2023 | Holmes | |
| 2023/0221784 A1 | 7/2023 | Wilson et al. | |
| 2023/0221997 A1 | 7/2023 | Wilson et al. | |
| 2023/0222468 A1 | 7/2023 | Wilson et al. | |
| 2023/0222469 A1 | 7/2023 | Wilson et al. | |
| 2023/0222470 A1 | 7/2023 | Wilson et al. | |
| 2023/0222471 A1 | 7/2023 | Wilson et al. | |
| 2023/0224216 A1 | 7/2023 | Wilson et al. | |
| 2023/0229512 A1 | 7/2023 | Sawal et al. | |
| 2023/0229516 A1 | 7/2023 | Sawal et al. | |
| 2023/0229818 A1 | 7/2023 | Sawal et al. | |
| 2023/0232549 A1 | 7/2023 | Sawal et al. | |
| 2023/0342787 A1 | 10/2023 | Mohanty et al. | |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

Subscription Information Repository 164

Entry A 180

Subscription Identifier 182

Subscription Limitations 184

One or More Actions 186

●
●
●

Entry N 188

FIG. 1D

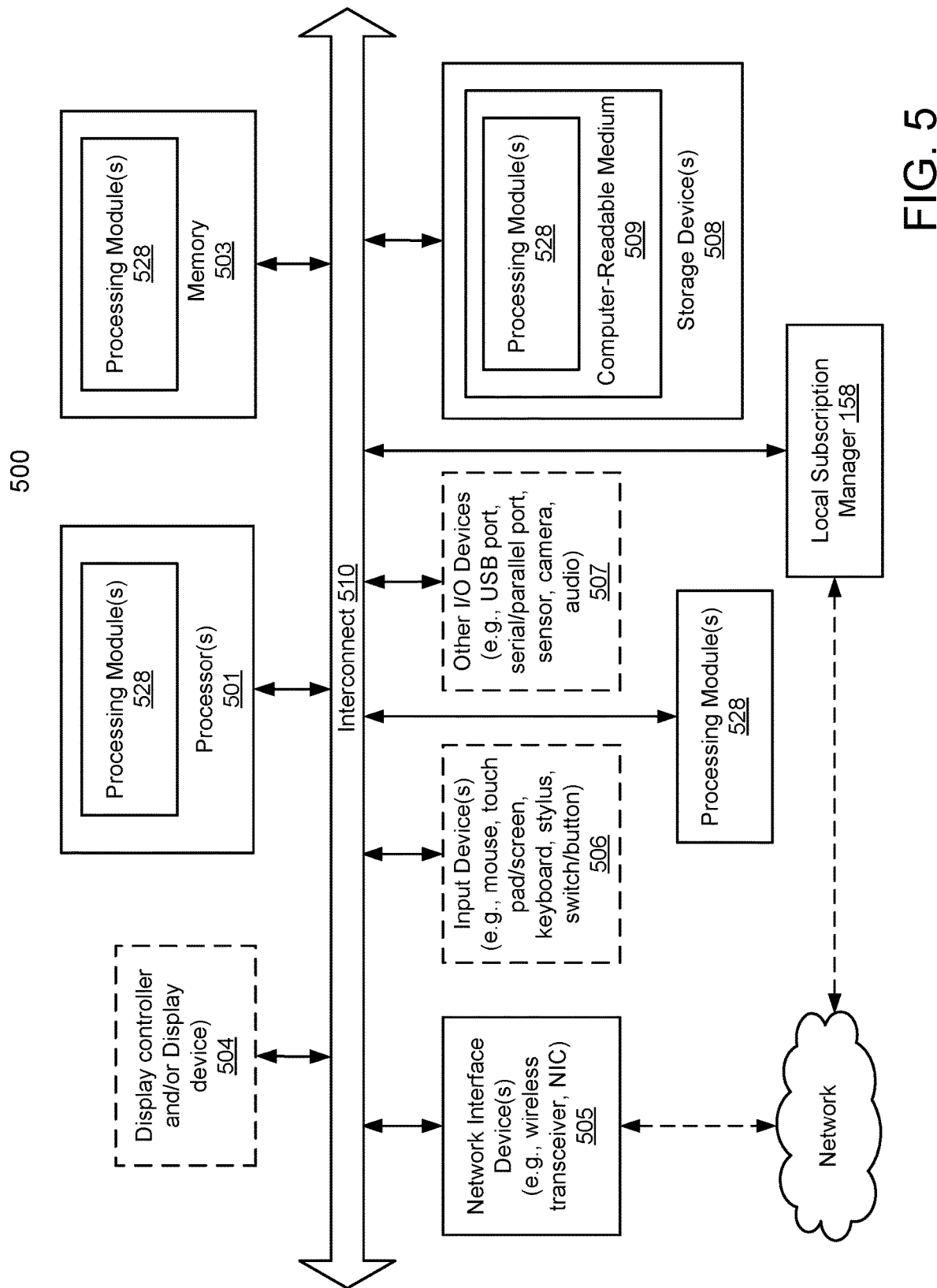

SYSTEM AND METHOD FOR DISTRIBUTED SUBSCRIPTION MANAGEMENT

FIELD DISCLOSED HEREIN

Embodiments disclosed herein relate generally to system management. More particularly, embodiments disclosed herein relate to systems and methods to manage systems within prescribed limitations.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIG. 1D shows a block diagram illustrating a subscription information repository in accordance with an embodiment.

FIG. 5 shows a block diagram illustrating a computing device in accordance with an embodiment.

DETAILED DESCRIPTION

Figure 1A:
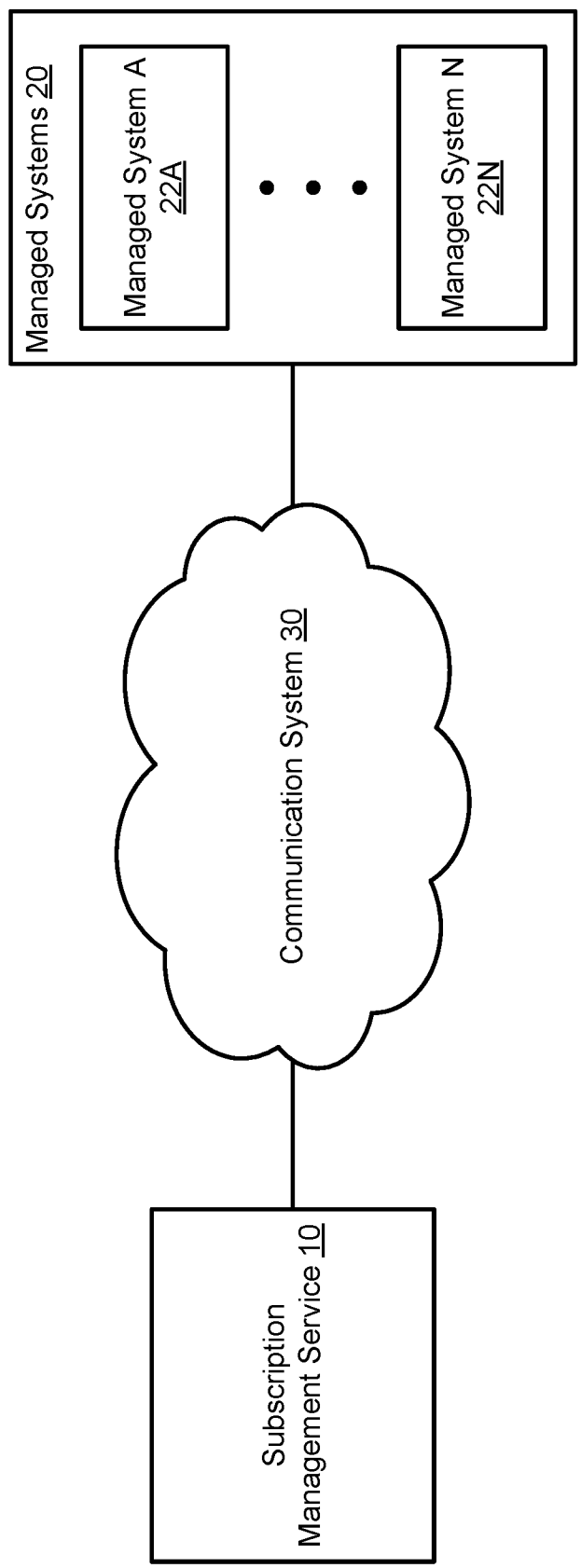
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services.

To improve the likelihood of the computer implemented services being provided, embodiments disclosed here relate to methods and systems for managing managed devices using a subscription based model. The subscription model may utilize a highly accessible service to obtain information regarding desired capabilities (e.g., a subscription) of a managed system, and use the acquired information to automatically configure and manage the features and capabilities of managed systems to meet those desired by users, operators, and/or other persons.

Additionally, the subscription model may provide for the automatic removal and/or disablement of functions and/or capabilities upon subscription limits being exceeded. The managed systems may host local subscription managers that include functionality to automatically enable and disable various components, to add and/or remove various software components, and/or otherwise manage the operation of the host devices. Consequently, the managed system may automatically be placed into compliance with subscriptions by the local subscription managers even under challenging circumstances such as, for example, limited and/or no communications with the subscription management service.

Consequently, the managed devices may be more likely to be able to provide the computer implemented services over time by virtue of the seamless and automatic compliance with the corresponding subscriptions associated with the managed devices.

In an embodiment, a computer-implemented method for operating a managed system is provided. The method may include obtaining, by a local subscription manager of the managed system, a subscription update for the managed system; performing, by the local subscription manager, one or more subscription enablement actions to modify operation of the managed system to match subscriptions maintained by a subscription manager that provided the subscription update; adding, by the local subscription manager, an entry to a subscription information repository accessible by the local subscription manager, the entry specifying, in part: a subscription limitation, and one or more actions associated with the subscription limitation being exceeded; and enforcing, by the local subscription manager, the subscriptions on the management system using the subscription information repository.

The managed system may include a first computing device and the local subscription manager comprises a second computing device that operates independently from the first computing device. The second computing device is hosted by the first computing device, computing resources of the first computing device are access by the second computing device via a bus, and computing resources of the second computing device are inaccessible to the first computing device.

The subscription information repository may not be accessible by the managed system. The subscription information repository may be stored in storage of the local subscription manager.

One or more actions associated with the subscription limitation comprise execution of a block of code by a processor of the managed system.

The entry may be stored in persistent storage and performance of the one or more actions associated with the subscription limitation do not depend on either of operation of a device remote to the managed system or operably connectivity of the managed system to the device remote to the managed system.

The subscription limitation may specify a point in time and the subscription limitation may be exceeded after the point in time is passed.

Enforcing the subscriptions may include monitoring operation of the managed system based on the subscription limitation; making a determination that the operation indicates that the subscription limitation has been exceeded; in response to the determination: obtaining the one or more actions associated with the subscription limitation; and performing the one or more actions associated with the subscription limitation.

Performing the one or more actions associated with the subscription limitations places the managed system in compliance with the subscriptions maintained by the subscription manager.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A management system may include any number of computing devices that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
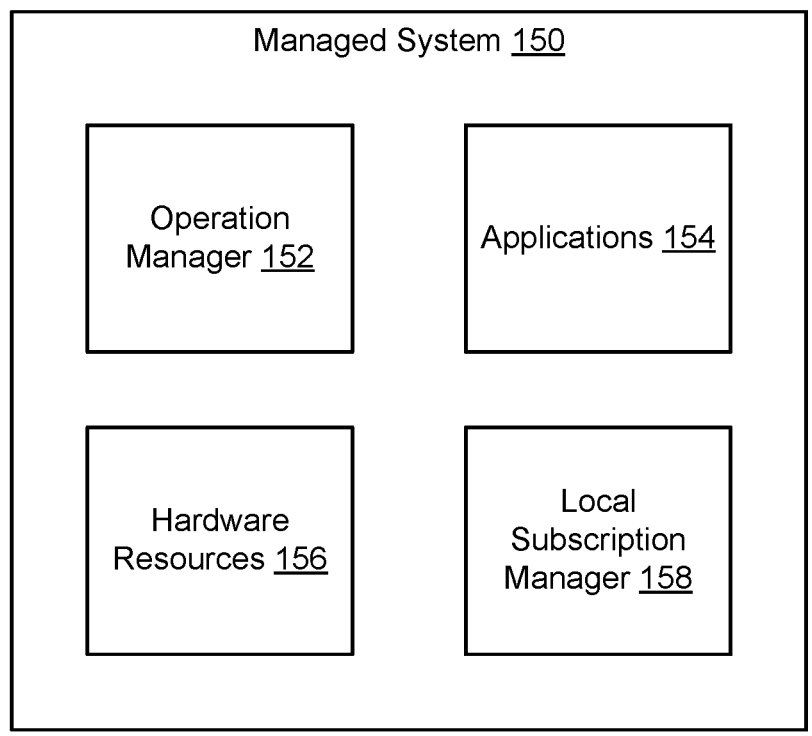
FIG. 1B shows a block diagram illustrating a managed device in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components and/or applications may need to be implemented by managed systems 20 depending on the computer implemented services desired to be provided by the respective managed systems. Refer to FIG. 1B for additional details regarding managed systems 20.

However, determining these configurations of hardware and/or software components (e.g., applications) necessary for corresponding computer implemented services may be technically challenging to identify. For example, a person may need to be familiar with a range of hardware and software components issues to effectively select the hardware components and/or software components of a system so that the system is capable of providing the desired computer implemented services. Further, if a system is procured that lacks necessary hardware and/or software components, the procured system may not be able to provide its desired functions.

In general, embodiments disclosed herein relate to system, devices and methods for managing one or more managed systems in a manner that may improve the likelihood of the managed system being able to provide desired computer implemented services. To do so, a system in accordance with embodiments disclosed herein may provide a distributed system for automatically identifying and implementing hardware and/or software configurations of managed systems. By doing so, embodiments disclosed herein may (i) reduce the cognitive burden for selecting and managing systems to provide desired computer implemented services, (ii) may improve the uptime of desired computer implemented services by making it more likely that managed systems are able to provide the desired services over time, and/or (iii) reducing the cost of obtaining desired computer implemented services by dynamically enabling and/or disabling only those functions/components (which may have associated cost for such functions) necessary to provide the desired computer implemented services.

To provide the above noted functionality, a system in accordance with an embodiment may include subscription management service 10. Subscription management service 10 may facilitate automatic configuration of managed systems 20. To do so, subscription management service 10 may (i) obtain information indicating desired functions of one or more of managed systems 20 and/or hardware components of managed systems 20 to be enabled and/or disabled (and/or information indicating corresponding periods of time of enablement/disablement of hardware/software components), (ii) correlate the desired functions with various hardware components (e.g., if explicit hardware components identifications are not made), and (iii) provide local subscription managers hosted by managed systems 20 with information regarding the identified hardware components, periods of enablement/disablement, and/or other information to allow the local subscription managers to configure managed systems 20 in a manner that conforms to the information (e.g., subscriptions) obtained by subscription management service 10. In this manner, a user or manager of managed systems 20 may configure managed systems 20 without needing to directly interact with the various hardware and/or software components of managed systems 20.

Further, the distributed system may allow a provider of managed systems 20 to selectively manage various functionalities provided by managed systems 20. By doing so, a provider of managed systems 20 may tailor the functions provided by managed systems 20 (e.g., from all possible functions) to only those requested, desired, and/or procured by an operator, manager, and/or user of managed systems 20.

For example, consider a scenario where a provider of a managed system does so on a contractual basis where a user of the managed system agrees to purchase subscriptions for various functionalities, hardware components, and/or software components. The user may use subscription management service 10 to select to which of the aforementioned features the user wishes to have enabled, to the extent of such enablement, durations of enablement, etc.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information).

Any of subscription management service 10 and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

In an embodiment, one or more of subscription management service 10 and managed systems 20 are operably connected via communication system 30. Communication system 30 may allow any of subscription management service 10 and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 5), a public network, and/or may include the Internet. For example, managed systems 20 may be operably connected to subscription management service 10 via the Internet. Subscription management service 10, managed systems 20, and/or communication system 30 may be adapted to perform one or more protocols for communicating via communication system 30.

While illustrated in FIG. 1 with a limited number of specific components, a system may include additional, fewer, and/or different components without departing from embodiments disclosed herein.

Turning to FIG. 1B, a block diagram illustrating managed system 150 in accordance with an embodiment is shown. Managed system 150 may be similar to any of managed systems 20 shown in FIG. 1A. Managed system 150 may provide desired computer implemented service by allowing for its automatic reconfiguration over time based on subscriptions maintained by subscription management service 10, shown in FIG. 1A.

In addition (and/or alternatively) to any of the components shown in FIG. 5, managed system 150 may include operation manager 152, applications 154, hardware resources 156, and local subscription manager 158. Each of these components is discussed below.

Operation manager 152 may generally manage operation of the component of managed system 150, except for local subscription manager 158. For example, operation manager 152 may be implemented with an operating system used to manage hardware resources 156 of managed system 150 to facilitate execution of applications 154. Operation manager 152 may also include, for example, a startup manager such as a basic input output system (BIOS) used to prepare managed system 150 to boot to an operating system or other type of operation management entity. For example, the startup manager may perform various administrative functions such as (i) identifying the hardware resource 156 and (ii) preparing the hardware resources 156 for use. Once prepared, the startup manager may handoff management of managed system 150 to the operating system or other type of management entity to place managed system 150 in a predetermined operating system conducive to applications 154 providing their functionalities. Prior to hand off, managed system 150 may not be in an operating state in which applications 154 may provide all, or a portion, of their functionalities.

Applications 154 may provide all, or a portion, of the computer implemented services desired by a user, operator, or other person associated with managed system 150. Applications 154 may utilize hardware resources 156 to provide their respective functionalities. Operation manager 152 may mediate presentation of hardware resources 156 by, for example, scheduling use, managing discontinuous access, and/or performing other actions to coordinate use of hardware resources 156 by applications 154 (and/or other entities).

In an embodiment, one or more of operation manager 152 and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 152 and applications 154. One or more of operation manager 152 and applications 154 may be implemented using other types of hardware devices without departing embodiment disclosed herein.

In an embodiment, one or more of operation manager 152 and applications 154 is implemented using a processor adapted to execute computing code stored on a persistent storage that when executed by the processor performs the functionality of one or more of operation manager 152 and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of operation manager 152, applications 154, and/or other entities not shown in FIG. 1B. As part of their respective operation, hardware resources 156 may host firmware and/or may otherwise be programmable to facilitate their respective operation.

Local subscription manager 158 may provide subscription management services. Subscription management services may include (i) obtaining information regarding subscriptions, (ii) performing one or more actions to implement the subscriptions, (iii) storing information regarding the subscriptions in a location accessible to local subscription manager 158, (iv) monitoring operation of managed system 150 based on subscription information (e.g., specified by the information regarding the subscriptions), and (v) based on the monitoring, performing one or more actions to force managed system 150 to comply with the subscriptions (or lack thereof) once managed system 150 may in the future and/or is currently exceeding one or more subscription limitations. The one or more actions to implement the subscriptions may include, for example, (a) activing various deactivated hardware resources, (b) loading various information into storage and/or memory of managed system 150, (c) causing processors or other devices of hardware resources 156 to execute various code blocks to cause them to perform certain operations, and/or (d) any other types of actions to implement changes to managed system 150 to comply with a subscription. Likewise, the one or more actions to force managed system 150 to comply with the subscriptions may include (I) disabling various activated hardware resources, (II) removing various information from storage and/or memory of managed system 150, (III) causing processor or other devices of hardware resources 156 to execute other code blocks to cause them to perform certain operations to revert previous changes to the operation of managed system 150 and/or remove certain functionalities, and/or (IIII) any other types of actions to implement changes to managed system 150 to comply with a subscription or lack thereof.

By providing its functionality, local subscription manager 158 may manage the configuration, behavior, and/or functionality of managed system 150 in a manner that automatically conforms it to match that expected by subscription management service 10. As part of the aforementioned process, local subscription manager 158 and subscription management service 10 may cooperate to enforce subscriptions on managed system 150. Local subscription manager 158 and subscription management service 10 may also perform one or more authentications of one another and/or communications from these components to prevent other entities from interfering with the cooperative operation of local subscription manager 158 and subscription management service 10.

In an embodiment, local subscription manager 158 is implemented with an out of band management controller. The out of band management controller may be hosted by managed system 150, be operably connected to hardware resources 156 (e.g., via interconnect 510, shown in FIG. 5), and may operate independently from other components (e.g., hardware and software) of managed system 150. The management controller may include functionality to manage the operation, configuration, and/or other characteristic of any hardware and/or software component of managed system 150. For example, the management controller may include functionality to disable/enable components, reconfigure components, add new components (e.g., load additional applications for execution), etc.

In an embodiment, the management controller includes a separate communication interface (e.g., from that of a communication interface of managed system 150) through which it communicates with subscription management service 10. In an embodiment, the management controller uses the same communication interface which managed system 150 uses to communicate with other devices. Either of these communication interface may facilitate communications with communication system 30, and devices connected to communication system 30.

Figure 1C:
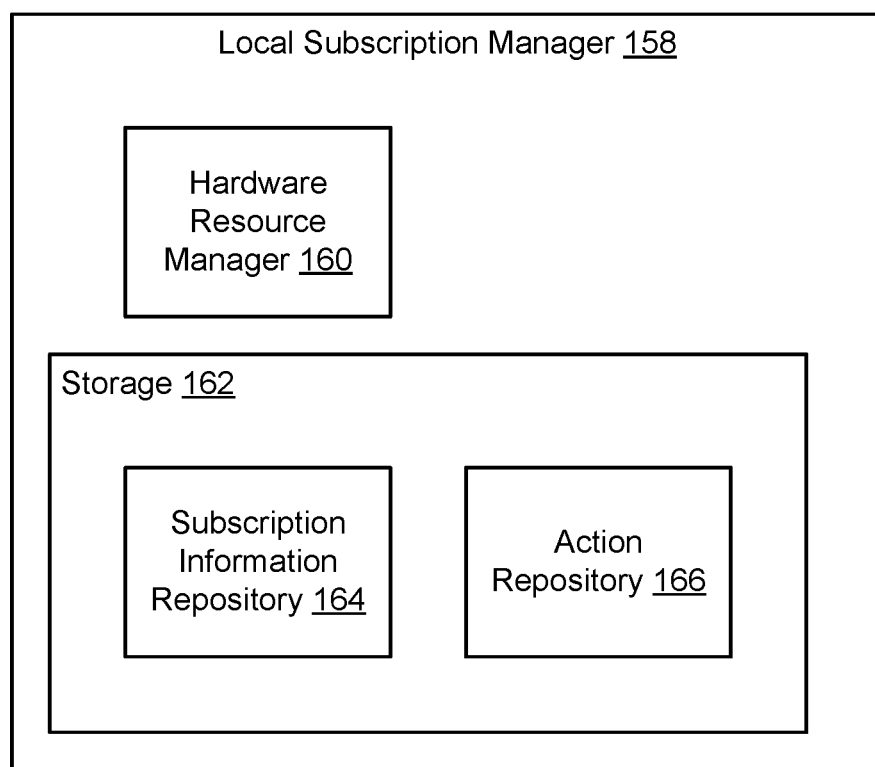
FIG. 1C shows a block diagram illustrating a local subscription manager in accordance with an embodiment.
Figure 2:
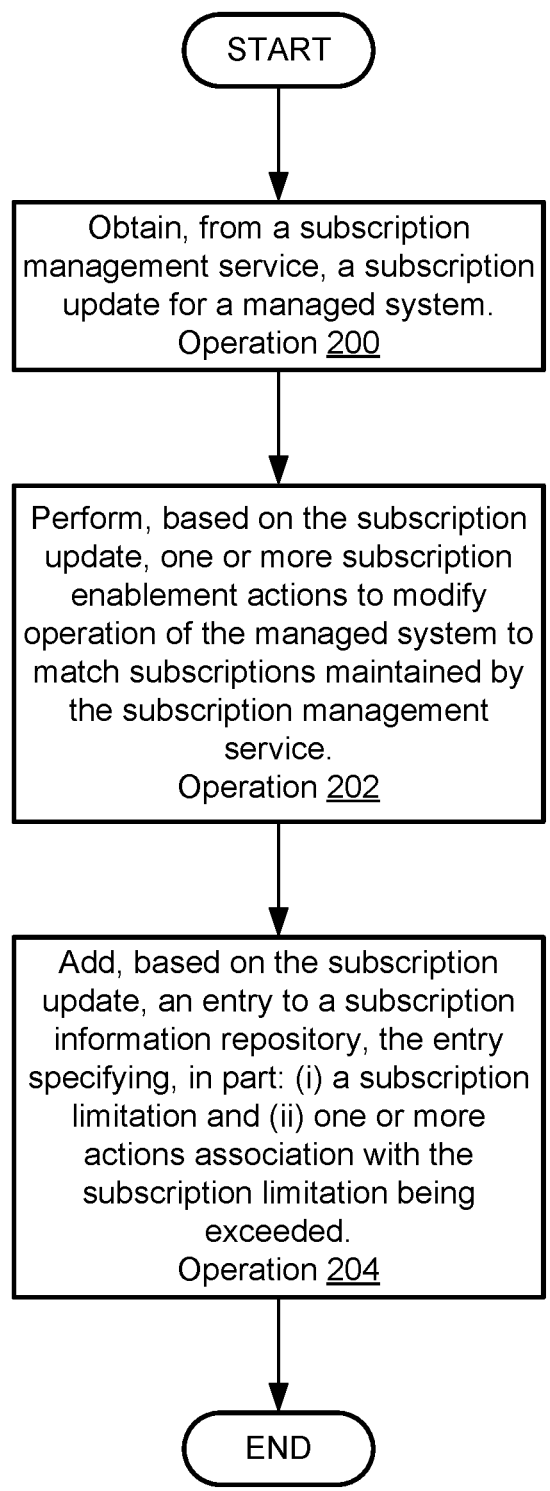
FIG. 2 shows a flow diagram illustrating a method of processing a subscription update in accordance with an embodiment.
Figure 3:
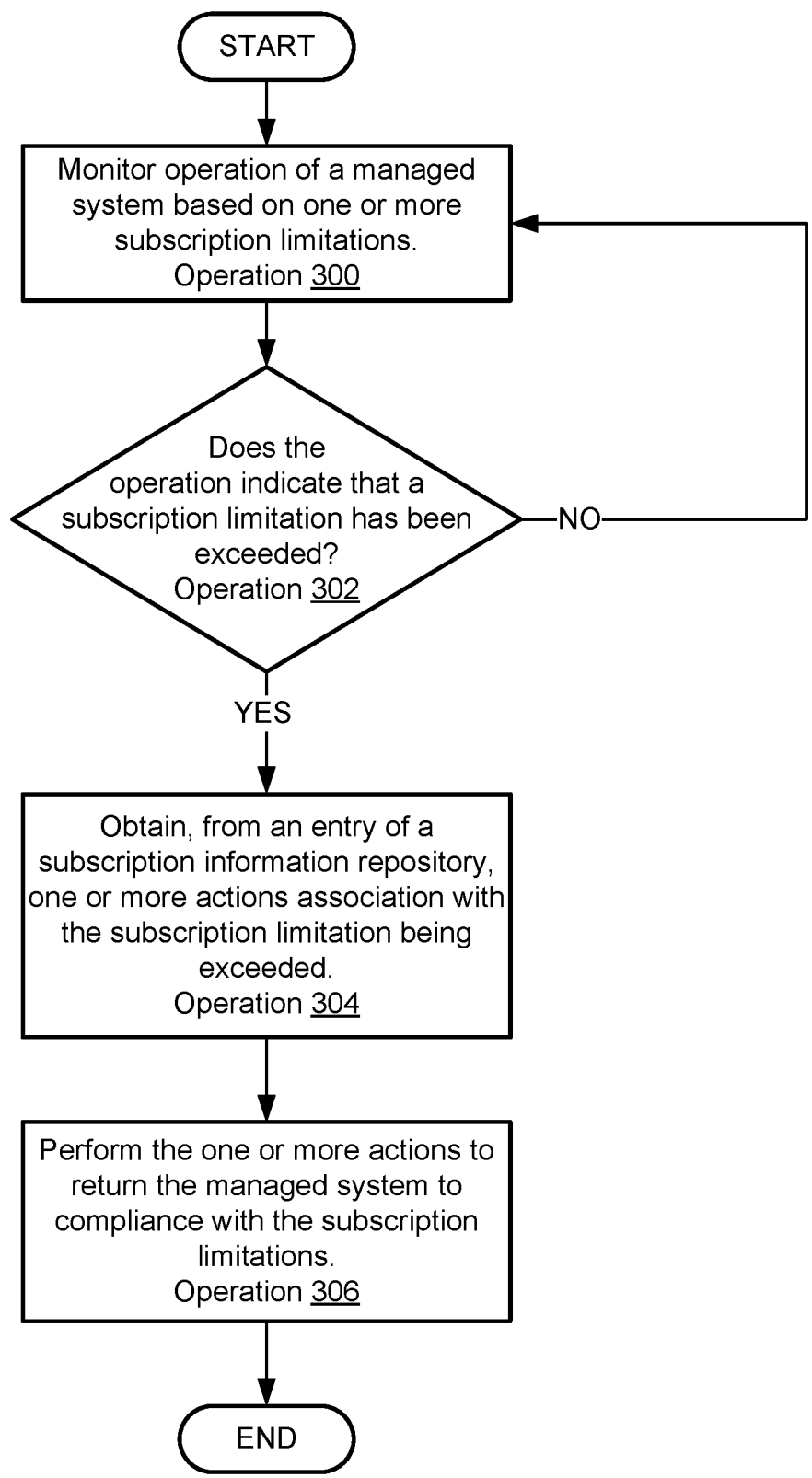
FIG. 3 shows a flow diagram illustrating a method of enforcing subscriptions on a managed system in accordance with an embodiment.
Figure 4:
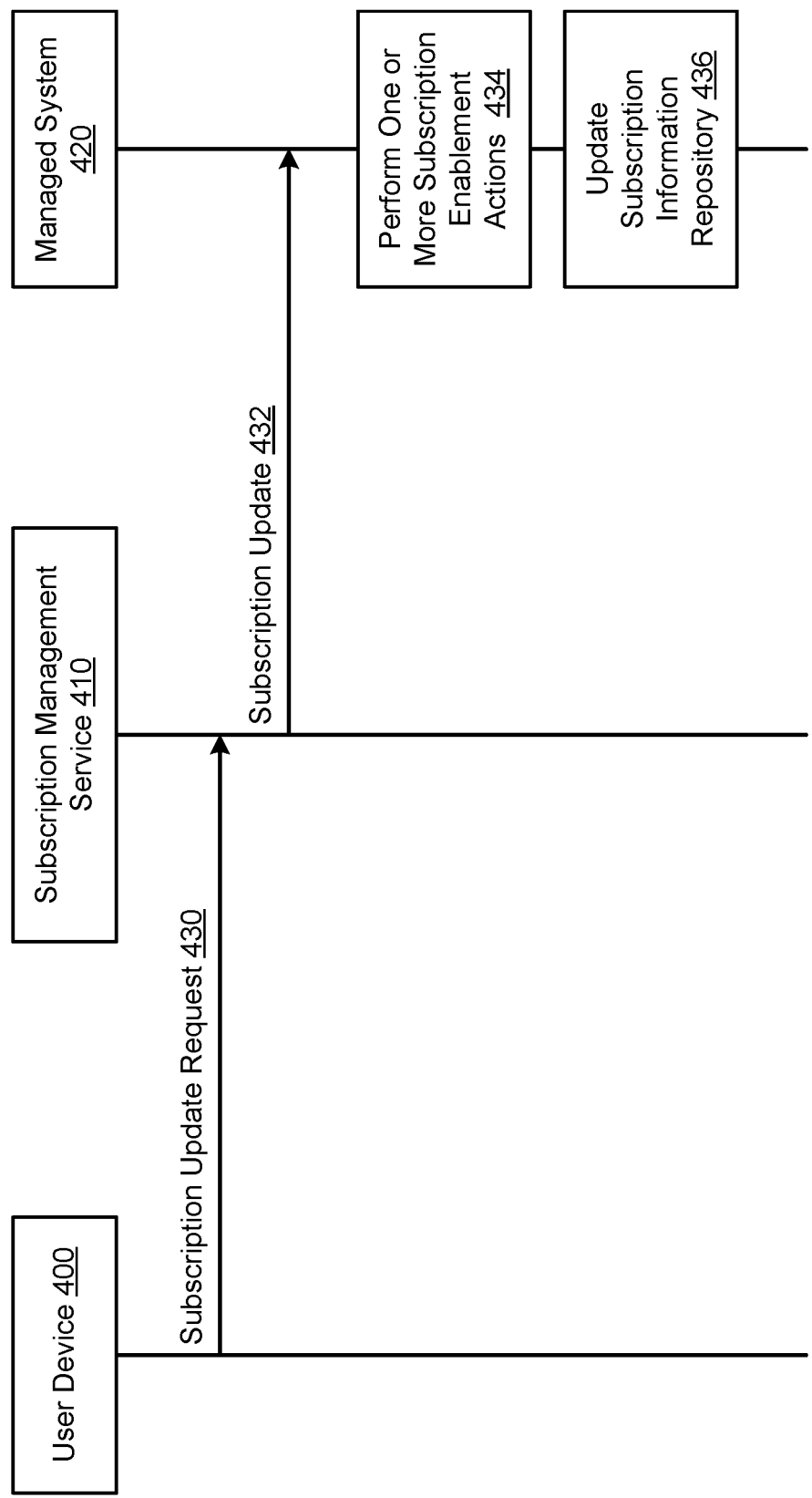
FIG. 4 shows a diagram illustrating interactions between and actions of components of a system in accordance with an embodiment.

When providing its functionality, local subscription manager 158 may perform all, or a portion, of the methods and operations illustrated in FIGS. 2-4. Refer to FIG. 1C for additional details regarding local subscription manager 158.

While illustrated in FIG. 1B with a limited number of specific components, a managed system may include additional, fewer, and/or different components without departing from embodiments disclosed herein.

Turning to FIG. 1C, a block diagram of local subscription manager 158 in accordance with an embodiment is shown. Local subscription manager 158 may be implemented with a computing device similar to that illustrated in FIG. 5. In addition (and/or alternatively) to any of the components shown in FIG. 5, local subscription manager 158 may include hardware resource manager 160 and storage 162. Each of these components is discussed below.

Hardware resource manager 160 may include functionality to (i) establish secure connections with and/or authenticate subscription management service 10, (ii) obtain information from subscription management service 10 via the secure connections, (iii) update subscription information repository 164 and/or action repository 166 based on the obtained information, and (iv) modify the configuration, function, and/or operation of a device that hosts local subscription manager 158 to conform to the information stored in subscription information repository 164 and/or action repository 166.

In an embodiment, hardware resource manager 160 is implemented using a hardware device including circuitry. The hardware device may be, for example, a digital signal processor, a field programmable gate array, or an application specific integrated circuit. The circuitry may be adapted to cause the hardware device to perform the functionality of hardware resource manager 160. Hardware resource manager 160 may be implemented using other types of hardware devices without departing embodiment disclosed herein.

In one embodiment, hardware resource manager 160 is implemented using a processor adapted to execute computing code stored on a persistent storage that when executed by the processor performs the functionality of hardware resource manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164 and action repository 166.

Subscription information repository may be implemented with one or more data structures that store information regarding subscriptions for a device that hosts local subscription manager 158. Refer to FIG. 1D for additional details regarding subscription information repository 164.

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by hardware resource manager 160 when a condition is met, such as a subscription limit being exceeded.

While various data structures have been illustrated and described in FIG. 1C, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1C may be stored remotely to local subscription manager 158 (e.g., in a storage of a host device, a cloud resource, etc.) in a manner that is still accessible to local subscription manager 158.

While illustrated in FIG. 1C with a limited number of specific components, a local subscription manager may include additional, fewer, and/or different components without departing from embodiments disclosed herein.

Turning to FIG. 1D, a diagram of subscription information repository 164 in accordance with an embodiment is shown. When information regarding subscriptions is obtained by a local subscription manager, subscription information repository 164 may be updated to reflect the information. For example, the local subscription manager may (if the information so indicates) perform actions to modify a host device (e.g., adding or removing functionality, access to various components, etc.) and add information to subscription information repository 164 such that limitations on a subscription may be identified and changes to implement the subscription reverted upon subscription limits being exceeded.

Subscription information repository 164 may include any number of entries 180, 188. Each of entries 180, 188 may correspond to a different current subscription. Each of entries 180, 188 may include a subscription identifier 182, subscription limitations 184, and one or more actions 186.

Subscription identifier 182 may identify to which subscription an entry corresponds. For example, subscription identifier 182 may be implemented with numerical identifiers (e.g., 1, 2, 3 . . . ). These integers may correspond with similar information maintained by the subscription management service such that common entries associated with the same subscription may be easily identifiable.

Subscription limitations 184 may specify one or more limitations (if any exist, in some cases no limitations may exist if a feature/function/component is enabled forever without limitation) regarding a subscription identified by subscription identifier 182. Subscription limitations 184 may specify, for example, time limits, expiration points in time, operational use limits (e.g., such as numbers of operations a graphic processor, accelerator, or other device may perform), and/or other information regarding limits on a subscription. Different subscriptions may have different subscription limitations (e.g., may expire at different times) The operation of a host system may be compared to the information in subscription limitations 184 to ascertain whether a subscription limitation has been exceeded.

One or more actions 186 may specify actions to be performed upon a subscription limit specified by subscription limitations 184 being exceeded. The actions may include, for example, depowering a hardware component, disabling software/hardware components, modifying a configuration of a software/hardware component, etc. In an embodiment, the one or more actions 186 include one or more executable (e.g., by a processor) code blocks. The code blocks, when executed, may cause actions to be performed that may cause changes made to a host device when a subscription is initiated to be reverted or to otherwise remove features, functions, and/or other aspects of a subscription that is no longer in force (e.g., when a subscription limit is exceeded).

Subscription information repository 164 may include any number of entries, with each entry specifying similar and/or different information.

Like the information in subscription information repository 164, a subscription management service may store similar information. However, in addition to the information included in the entries shown in FIG. 1D, the information stored by the subscription management system may include two different sets of one or more actions. A first set of the one or more actions may cause (when the first set of actions are performed) a feature, function, and/or other aspect of a host device to be modified such that the host device is able to provide features/functionalities associated with the subscription. For example, a first set of one or more actions may include powering a depowered component such that it becomes utilized by operation managers (e.g., 152) and/or applications (e.g., 154) of a host device. A second set of the one or more actions may cause (when the second set of actions are performed) a feature, function, and/or other aspect of a host device to be modified such that the host device is not able to provide features/functionalities associated with the subscription. For example, a second set of one or more actions may include depowering a powered component that was previously powered to implement a subscription such that the power is no longer utilized by operation managers (e.g., 152) and/or applications (e.g., 154) of a host device.

As discussed above, the components of FIG. 1A may perform various methods to provide computer implemented services using managed systems. FIGS. 2-3 illustrate examples of methods that may be performed by the components of FIG. 1A. For example, a local subscription manager of a managed system may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of processing a subscription update in accordance with an embodiment is shown. The method illustrated in FIG. 2 may be performed when a person changes a subscription associated with a managed system. For example, a person may utilize the subscription management service 10 to add a new subscription for a managed system to modify the operation of the managed system. Doing so may prompt the subscription management service 10 to generate and provide the subscription update to the managed system.

At operation 200, a subscription update for a managed system is obtained from a subscription management system. The subscription update may be obtained by a local subscription manager. For example, the subscription update may be obtained by receiving it in a message from the subscription management service via a communication system.

In an embodiment, the subscription update specifies (i) a subscription identifier, (ii) one or more subscription limitations, (iii) one or more subscription enablement actions, and (iv) one or more subscription disablement actions.

At operation 202, one or more subscription enablement actions are performed based on the subscription update. Performing the one or more subscription enablement actions may modify operation of a managed system to match subscriptions maintained by the subscription management system.

In an embodiment, the one or more subscription enablement actions are specified or otherwise indicated by the subscription update. For example, the subscription update may include them or may include a reference to an action repository maintained by the local subscription manager that includes the one or more subscription enablement actions thereby allowing the enablement actions to be obtained from the repository.

In an embodiment, the subscription enablement actions are discarded after being performed. Consequently, local information regarding the action may not be maintained by the local subscription manager. Accordingly, the actions may not be obtained even with access to the local subscription manager after being implemented but discarded.

At operation 204, an entry is added to a subscription information repository based on the subscription update. In an embodiment, the entry specifies, in part, a subscription limitation and one or more actions associated with the subscription being exceeded. The one or more actions may be disablement actions for the enablement actions performed in operation 202. An identifier for the subscription may also be added. By doing so, an entry similar to those illustrated in FIG. 1D may be added to the subscription information repository. As discussed above, the subscription information repository may be stored in a location accessible to the local subscription manager and inaccessible to a host device.

The method may end following operation 204.

Using the method illustrated in FIG. 2, a managed system may be placed in a state consistent with a subscription maintained by a subscription management system, an in a state where features added to the managed system may be removed or otherwise reverted automatically upon an occurrence of a subscription limitation being exceeded.

Turning to FIG. 3, a flow diagram illustrating a method of enforcing compliance with subscriptions in accordance with an embodiment is shown. The method may be performed, in part, by a local subscription manager that previously obtained information regarding a subscription for a managed system hosting the local subscription manager.

At operation 300, operation of a managed system is monitored based on one or more subscription limitations. The subscription limitations may be monitored by identifying the subscription limitations using an entry in a subscription repository and periodically (or intermittently) checking the operation of the managed system to ascertain whether the operation exceeds the subscription limitations.

For example, consider a scenario where a subscription limitation is a point in time being exceeded (e.g., an end to a subscription). In such a scenario, the local subscription manager may monitor the time until the current time exceeds the point in time. When the current time exceeds the point in time, then the monitoring may indicate that the managed system has exceeded the one or more subscriptions.

At operation 302, it is determined whether the operation indicates that a subscription limitation has been exceeded. The determination may be made by comparing relevant characteristics of the operation of the managed system to corresponding subscription limitations (which may define limitations in terms of thresholds, ranges, occurrences of certain conditions, etc.). The determination may be made upon these comparisons.

If it is determined that the operation indicates that a subscription limitation has been exceeded, then the method may proceed to operation 304. Otherwise, the method may return to operation 300 to continue monitoring of the operation of the managed system to ascertain whether a subscription limitation has been exceeded (e.g., in the future).

At operation 304, one or more actions associated with the subscription limitation being exceeded is obtained. The one or more actions may be obtained from an entry of the subscription information repository (e.g., from an entry that defines the subscription limitations, which may also specify or otherwise indicate the one or more actions). The one or more actions may be disablement actions for the subscription associated with the subscription limitations.

At operation 306, the one or more actions are performed to return the managed system to compliance with the subscription limitations. Performing the one or more actions may include, for example, causing code blocks to be performed by processors of the host system, processors of the local subscription manager, etc. By performing the one or more actions, the host managed system may be placed into compliance with subscriptions maintained by a subscription management service.

The method may end following operation 306.

In an embodiment, the method shown in FIG. 3 is performed by the local subscription manager while it is unable to communicate with the subscription managements service. By maintaining its own subscription repository, the local subscription manager may be empowered to automatically place managed systems into compliance with subscriptions even when information regarding the subscriptions maintained by the subscription management service may not be accessed. For example, in a scenario where a managed system has been disconnected from a communication system.

Turning to FIG. 4, example actions and interactions between user device 400, subscription management service 410, and managed system 420 in accordance with an embodiment are shown. Like named components in FIG. 4 and FIG. 1A may be similar.

User device 400 (e.g., a cell phone, laptop computer, tablet computer, etc.) may be a device utilized by a person tasked with managing managed system 420. To manage managed system 420, the user may provide a subscription update request 430 to subscription management service 410. The user may do so via a webpage displayed on user device 400 and driven by subscription management service 410.

Subscription update request 430 may specify that a graphics processing unit function is to be added to managed system 420 for the next 90 days. In response to receiving subscription update request 430, subscription management service 410 may generate and send subscription update 432 to managed system 420. The subscription update may specify, in part, an action (e.g., enablement action) to power a depowered graphics processing unit, a subscription limitation of 90 days, and an action (e.g., disablement action) to depower a powered graphics processing unit.

Managed system 420, in response to receiving subscription update 432, may perform one or more subscription enablement actions 434 such as powering the depowered graphics processing unit. Managed system 420 may also update subscription information repository 436 to reflect the terminal time of the subscription. For example, an entry specifying a period of 90 days or a fixed end point corresponding to 90 days and the disablement actions may be added to the subscription information repository.

Following the update of subscription information repository 436, the local subscription manager of managed system 420 may monitor the operation of managed system 420 to identify when the subscription limit of 90 days has been exceeded, and may automatically perform the disablement actions in response to the 90 days being exceeded.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

As discussed above, various components may be implemented with computing devices. For example, any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for operating a managed system in a distributed system, the method comprising:
    obtaining, by a local subscription manager of the managed system, a subscription update for the managed system;
    performing, by the local subscription manager, one or more subscription enablement actions to modify operation of the managed system to match subscriptions maintained by a subscription manager that provided the subscription update, wherein the local subscription manager is a management controller installed within the managed system and is distinct and separate from a processor of the managed system, and wherein performing the one or more subscription enablement actions to modify operation of the managed system comprises:
        instructing, by a processor of the local subscription manager, the processor of the managed system to perform the one or more subscription enablement actions;
    adding, by the local subscription manager, an entry to a subscription information repository accessible by the local subscription manager, the entry specifying, in part:
        a subscription limitation, and
        one or more actions associated with the subscription limitation being exceeded; and
    enforcing, by the processor of the local subscription manager through instructing the processor of the managed system to perform one or more actions that enforce the subscriptions, the subscriptions on the managed system using the subscription information repository without further instructions or intervention by the subscription manager.

2. The computer-implemented method of claim 1, wherein the managed system comprises a first computing device and the local subscription manager comprises a second computing device that operates independently from the first computing device.

3. The computer-implemented method of claim 2, wherein the second computing device is hosted within the first computing device, computing resources of the first computing device are accessible by the second computing device via a bus, and computing resources of the second computing device are inaccessible to the first computing device.

4. The computer-implemented method of claim 1, wherein the subscription information repository is not accessible by the managed system, and wherein the subscription information repository is stored in storage of the local subscription manager.

5. The computer-implemented method of claim 1, wherein the one or more actions associated with the subscription limitation comprise execution of a block of code by a processor of the managed system.

6. The computer-implemented method of claim 1, wherein the entry is stored in persistent storage and performance of the one or more actions associated with the subscription limitation do not depend on either of operation of a device remote to the managed system or operably connectivity of the managed system to the device remote to the managed system.

7. The computer-implemented method of claim 1, wherein the subscription limitation specifies a point in time and the subscription limitation is being exceeded after the point in time is passed.

8. The computer-implemented method of claim 1, wherein enforcing the subscriptions comprises:
monitoring operation of the managed system based on the subscription limitation;
making a determination that the operation indicates that the subscription limitation has been exceeded;
in response to the determination:
obtaining the one or more actions associated with the subscription limitation; and
performing the one or more actions associated with the subscription limitation.

9. A non-transitory machine-readable medium having instructions stored therein, which when executed by a processor, cause the processor to perform operations for operating a managed system in a distributed system, the operations comprising:
obtaining, by a local subscription manager of the managed system, a subscription update for the managed system;
performing, by the local subscription manager, one or more subscription enablement actions to modify operation of the managed system to match subscriptions maintained by a subscription manager that provided the subscription update, wherein the local subscription manager is a management controller installed within the managed system and is distinct and separate from a processor of the managed system, and wherein performing the one or more subscription enablement actions to modify operation of the managed system comprises:
instructing, by a processor of the local subscription manager, the processor of the managed system to perform the one or more subscription enablement actions;
adding, by the local subscription manager, an entry to a subscription information repository accessible by the local subscription manager, the entry specifying, in part:
a subscription limitation, and
one or more actions associated with the subscription limitation being exceeded; and
enforcing, by the processor of the local subscription manager through instructing the processor of the managed system to perform one or more actions that enforce the subscriptions, the subscriptions on the managed system using the subscription information repository.

10. The non-transitory machine-readable medium of claim 9, wherein the managed system comprises a first computing device and the local subscription manager comprises a second computing device that operates independently from the first computing device.

11. The non-transitory machine-readable medium of claim 10, wherein the second computing device is hosted within the first computing device, computing resources of the first computing device are accessible by the second computing device via a bus, and computing resources of the second computing device are inaccessible to the first computing device.

12. The non-transitory machine-readable medium of claim 9, wherein the subscription information repository is not accessible by the managed system.

13. The non-transitory machine-readable medium of claim 12, wherein the subscription information repository is stored in storage of the local subscription manager.

14. A managed system, comprising:
a first processor; and
a local subscription manager adapted to perform operations for managing operation of the managed system in a distributed system to comply with subscriptions, wherein the local subscription manager is a management controller installed within the managed system and is distinct and separate from a processor of the managed system, and wherein the operations comprising:
obtaining a subscription update for the managed system;
performing one or more subscription enablement actions to modify operation of the managed system to match the subscription, the subscriptions being maintained by a subscription manager that provided the subscription update, wherein performing the one or more subscription enablement actions to modify operation of the managed system comprises:
instructing, by a second processor of the local subscription manager, the first processor to perform the one or more subscription enablement actions;
adding an entry to a subscription information repository accessible by the local subscription manager, the entry specifying, in part:
a subscription limitation, and
one or more actions associated with the subscription limitation being exceeded; and
enforcing, using the second processor to instruct the first processor to perform one or more actions that enforce the subscriptions, the subscriptions on the managed system using the subscription information repository.

15. The managed system of claim 14, wherein the managed system comprises a first computing device comprising the processor, and the local subscription manager comprises a second computing device that operates independently from the first computing device.

16. The managed system of claim 15, wherein the second computing device is hosted within the first computing device, computing resources of the first computing device are accessible by the second computing device via a bus, and computing resources of the second computing device are inaccessible to the first computing device.

17. The managed system of claim 14, wherein the subscription information repository is not accessible by the managed system.

18. The managed system of claim 17, wherein the subscription information repository is stored in storage of the local subscription manager.

19. The computer-implemented method of claim 1, wherein enforcing the subscriptions on the managed system comprises, by the processor of the local subscription manager: causing the processor of the managed system to activate or disable one or more hardware resources of the managed system.

20. The computer-implemented method of claim 1, wherein the managed system is not included in a distributed control layer of the distributed system and the local subscription manager instead provides sole control plane functionality for the managed system.

\* \* \* \* \*